Figure 1:
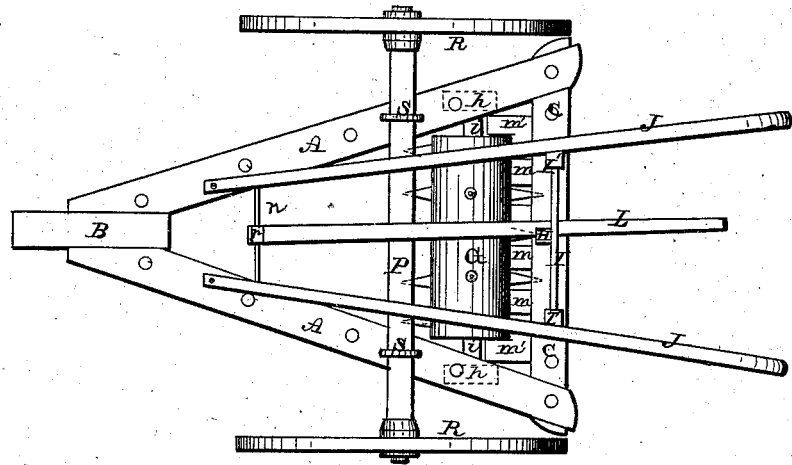
Figure 2:
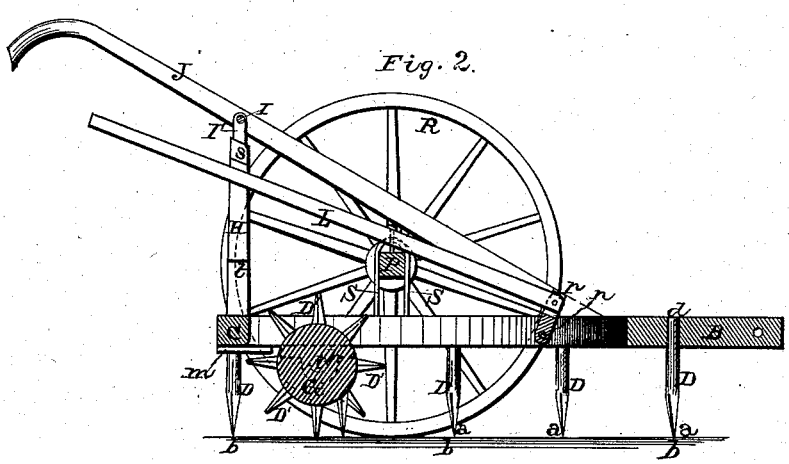
Figure 3:

W. G. P. SHARP.
HARROW.

No. 192,942.

Patented July 10, 1877.

WITNESSES

INVENTOR
W. G. P. Sharp
per
F. A. Lehmann, Atty

UNITED STATES PATENT OFFICE.

WILEY G. P. SHARP, OF WARTRACE, TENNESSEE.

IMPROVEMENT IN HARROWS.

Specification forming part of Letters Patent No. 192,942, dated July 10, 1877; application filed May 17, 1877.

*To all whom it may concern:*

Be it known that I, WILEY G. P. SHARP, of Wartrace, in the county of Bedford and State of Tennessee, have invented certain new and useful Improvements in Harrows; and I do hereby declare the following to be a full, clear, and exact description of the invention, such as will enable others skilled in the art to which it pertains to make and use it, reference being had to the accompanying drawings, which form part of this specification:

The nature of my invention consists in the construction and arrangement of a pulverizing and cultivating harrow, as will be hereinafter more fully set forth.

The annexed drawings, to which reference is made, fully illustrate my invention.

The frame of my harrow is composed of two inclined side beams, A A, united at their front ends with the pole or draft-bar B between them. The rear ends of the side beams A are spread a suitable distance apart, and connected by a cross-bar, C, making a triangular frame of any suitable dimensions. In this frame are inserted rake-teeth D D, as shown, said teeth being formed at their upper ends with shanks $d$, to be passed through holes made in the frame for that purpose. Each tooth has front and rear cutting-edges $a\ a$, and is made thicker in the center, tapering to a point, $b$—or, in other words, the tooth is diamond-shaped in its cross-section.

In suitable boxes $h\ h$, on the under sides of the side beams A A, near their rear ends, are placed the journals $i\ i$ of a roller, G, which is also provided with similarly-shaped teeth D'.

The teeth D' of the roller are set into the same in rows, and alternating substantially as shown.

On the under side of the rear cross-bar C of the frame are secured forwardly-projecting clearers $m\ m$, between which the roller-teeth D' pass during the revolution of the roller, to clear the teeth of all adhering earth, weeds, trash, &c. The two side clearers $m'\ m'$ are projected still farther forward, to come alongside the ends of the roller near the journals $i$, to prevent any trash, &c., from winding around the roller-journals.

J J are the handles of the harrow, the front ends of which are secured to the side beams A, and their rear ends supported by means of a round or cross-bar, I, passing through them and through upright standards I' I', secured to the rear bar C of the harrow-frame.

P represents an axle, provided with a wheel, R, on each end. This axle is placed in vertical staples or slotted standards S S, projecting upward from the side beams A A of the harrow-frame, the axle being grooved on front and rear for the passage of the arms of the staples or standards. To this axle is connected a lever, L, the front end of which is, by a metal strap, $p$, connected with a rod, $n$, between the side beams A A of the harrow-frame, and the rear end of the lever projects between the standards I', and may be locked on an upright standard, H, secured to the cross-bar C between the handle-standards I' I'. This latter standard H has at the top a shoulder, $s$, and near the bottom a reversed shoulder, $t$.

By leaving the lever L free at its rear end the wheels R will simply run on the ground, with nothing but their own weight, while by raising the rear end of the lever, and placing the same on the shoulder $s$ of the standard H, the axle P and wheels R R are elevated so that the wheels will not touch the ground, and the weight of said axle and wheels is thus added to the weight of the harrow.

By depressing the rear end of the lever L and placing the same under the reversed shoulder $t$, the entire harrow is raised out of the ground and suspended below the axle, the parts being so arranged that the harrow will then be balanced. In this position the harrow is easily moved to and from the field, or from one field to another.

In operation, the harrow is easily raised, by means of the lever L, to pass obstructions or for clearing purposes, when necessary.

Having thus fully described my invention, what I claim as new, and desire to secure by Letters Patent, is—

In a harrow, the combination of the triangular frame A, having the revolving roller G journaled in its rear end, and both provided with teeth, handles J, lever L, axle P, wheels R, slotted standards S, and standard H, both the frame and the roller being raised at the same time, substantially as shown.

In testimony that I claim the foregoing I have hereunto set my hand this 4th day of May, 1877.

WILEY GRAHAM PITTS SHARP.

Witnesses:
Jo. H. SMITH,
JOHN A. MACKEY.